(12) United States Patent
Kech et al.

(10) Patent No.: US 6,365,998 B1
(45) Date of Patent: Apr. 2, 2002

(54) CANNED MOTOR PUMP WITH WINDING CARRIER

(75) Inventors: Hansjürgen Kech, Herdecke; Uwe Dreihaus, Hamm; Ingo Fabricius, Dortmund, all of (DE)

(73) Assignee: Wilo GmbH, Dortmund (DE)

( * ) Notice: Subject to any disclaimer, the term of this patent is extended or adjusted under 35 U.S.C. 154(b) by 0 days.

(21) Appl. No.: 09/320,906

(22) Filed: May 27, 1999

(30) Foreign Application Priority Data

Jun. 2, 1998 (DE) ......................................... 198 24 345

(51) Int. Cl.$^7$ .......................... H02K 3/46; H02K 5/132; H02K 5/128; H02K 5/22
(52) U.S. Cl. .......................... 310/194; 310/86; 310/71
(58) Field of Search ....................... 310/86, 194, 68 B, 310/208, 184, 43, 89, 71; 29/596

(56) References Cited

U.S. PATENT DOCUMENTS

| | | | | |
|---|---|---|---|---|
| 3,911,300 A | * | 10/1975 | Lebkuchner | 310/86 |
| 4,859,890 A | * | 8/1989 | Sedgewick | 310/208 |
| 5,034,644 A | * | 7/1991 | Keck | 310/254 |
| 5,323,075 A | * | 6/1994 | Denk et al. | 310/68 B |
| 5,656,880 A | * | 8/1997 | Clark | 310/268 |
| 5,698,923 A | * | 12/1997 | Scherzinger et al. | 310/194 |
| 6,028,386 A | * | 2/2000 | Kech et al. | 310/194 |
| 6,091,174 A | * | 7/2000 | Genster | 310/89 |
| 6,177,741 B1 | * | 1/2001 | Lutkenhaus et al. | 310/71 |
| 6,229,240 B1 | * | 5/2001 | Kech et al. | 310/194 |

FOREIGN PATENT DOCUMENTS

| | | |
|---|---|---|
| DE | 27 51 516 | 5/1979 |
| DE | 31 05 428 C2 | 8/1982 |
| DE | 44 24 996 | 1/1996 |
| DE | 44 38 132 A1 | 5/1996 |
| DE | 44 41 378 A1 | 5/1996 |
| DE | 196 24 145 | 1/1998 |

* cited by examiner

*Primary Examiner*—Karl Tamai
(74) *Attorney, Agent, or Firm*—Herbert Dubno

(57) ABSTRACT

A canned motor pump has a can separating the rotor and the fluid compartment of the pump from the stator. The stator winding is affixed to a winding carrier which is shoved over and in heat-conducting relation with the can. The casing carries the electronic circuitry for commutating the motor and this circuitry is connected with the stator winding via a plug connector on the carrier.

7 Claims, 2 Drawing Sheets

CANNED MOTOR PUMP WITH WINDING CARRIER

FIELD OF THE INVENTION

Our present invention relates to a canned motor pump of the type in which the motor includes a carrier for the stator winding and, more particularly, wherein the fluid side of the pump is separated from the stator by a motor can, i.e. a pump in which the rotor and impeller on the one hand are separated from the stator winding on the other hand by a motor can.

BACKGROUND OF THE INVENTION

Can-motor pumps usually are asychronously operated with three phase or simple alternating current energization since asynchronous motors are well developed and are characterized by a compact construction and a high degree of reliability in low power and medium power applications, the efficiency of asynchronous motors is, however, insufficient. It is also a drawback that with small asynchronous machines a disproportionally large portion of the cost of the motor is in the electronics for stepless motor control. Canned motors have the advantage that the electrical input side of the motor is hermetically sealed by means of the motor can from the rotating parts and the medium displaced by the pump.

In conventional canned motor pumps with asynchronous drives, the stator winding is usually wound in an insulated stator sheet stack and shoved with the stator sheet stack onto the metallic can.

Conventional commutated drive canned motor pumps may have the stator winding wound directly on the motor can. A drawback with such canned motor pumps is that in case of a defect in the pump, the entire stator winding must be dismounted from the can and generally cannot be reused. To the extent that the stator winding is adhesively or otherwise bonded to the motor can, both the winding and the can must be discarded or scrapped.

OBJECTS OF THE INVENTION

It is, therefore, the principal object of the present invention to provide an improved canned motor pump of lower fabrication cost and free from the drawbacks of earlier systems.

Another object of this invention is to provide a canned motor pump which is economical, easily disassembled and wherein the stator winding or coils need not be discarded or scrapped in the case of disassembly for repair purposes.

Still another object of this invention is to provide a canned motor pump whereby drawbacks of conventional motor-driven pump systems are avoided.

SUMMARY OF THE INVENTION

These objects and others which will become apparent hereinafter are attained, in accordance with the invention, by providing around the motor can and fitted over and onto the motor can a cylindrical winding carrier which receives the stator winding and at least partly surrounds the cylindrical part of the motor can. With this construction it is possible to remove the stator winding with the winding carrier which can be left in place or to shove the carrier with the stator winding onto the mounted motor can and thus to reuse the carrier and the stator winding without having to dismount the motor can and without damaging the latter or the coils.

The stator winding can be premounted upon the carrier and especially can be baked thereon and thus fixed in position on the winding carrier. The winding carrier can then be shoved onto the cylindrical portion of the motor can and can be secured by fastening means on the motor can or on the pump housing and thereby held in position.

The winding carrier advantageously rests with its cylindrical inner surface on the cylindrical outer surface of the motor can, thereby providing a thermally conductive bond between the winding carrier and the motor can.

The winding carrier can be composed of a temperature resistant synthetic resin material, e.g. a polycarbonate, which can lead to a particularly low overall weight of the pump.

To the extent that the motor is an electrically commutated motor, the permanent magnets for torque transmission from the stator to the pump rotor can be spaced equidistantly around the rotor axis on the side of the rotor turned toward the can. The commutation can be effected by electronic circuitry within the pump casing or on the latter with the heat generated by the commutating electronics being transmitted by thermal bridges to the casing and ultimately the displaced medium. For the detection of rotor position or rotor speed, sensors can be integrated into the stator winding affording still further cost savings.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
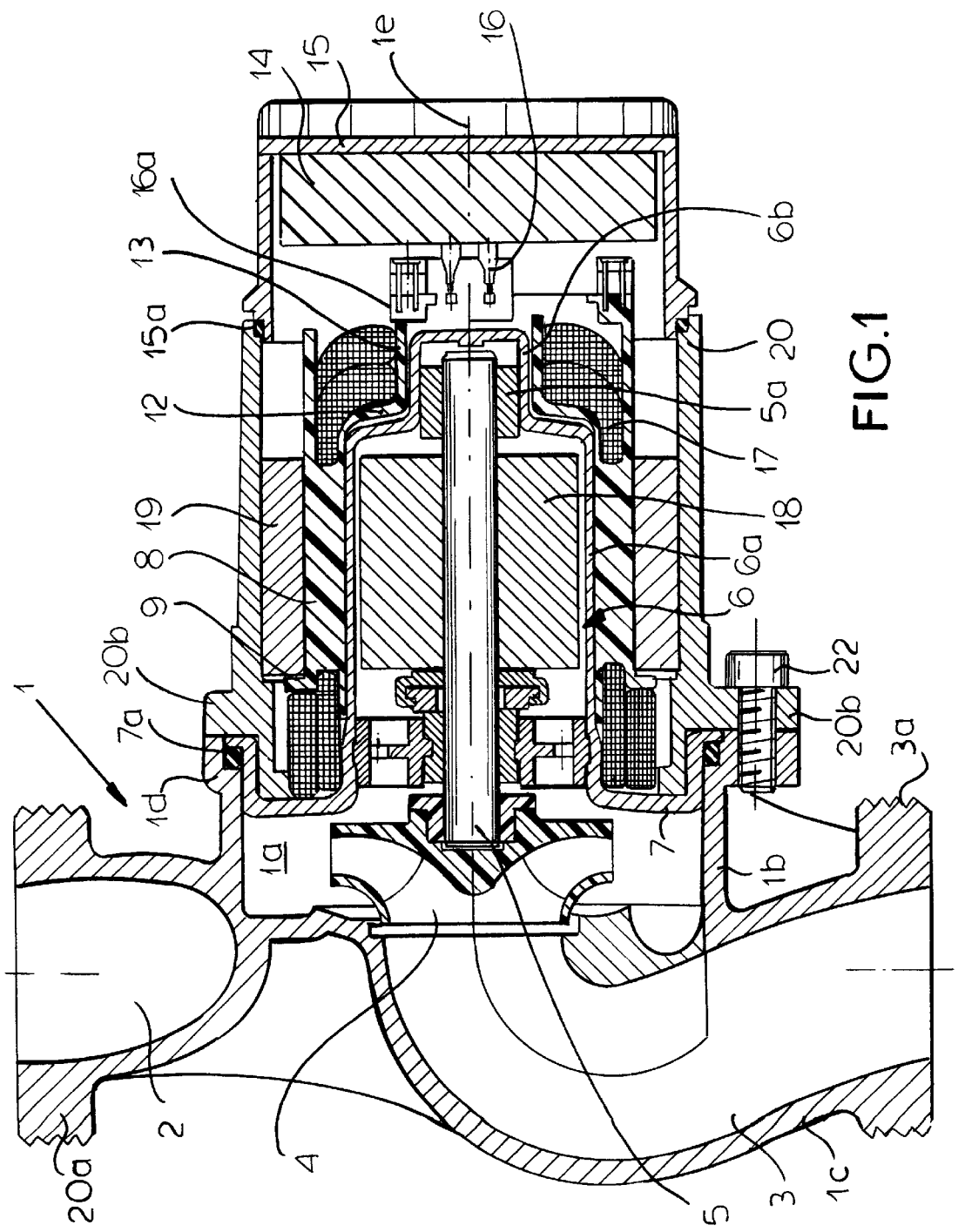
FIG. 1 is a cross section through a canned motor pump, according to the invention, with a winding carrier.

FIG. 1 shows a canned motor pump 1 which has an impeller 4 rotatable in a pumping chamber 1a provided in a cylindrical portion 1b of a pump body 1c having a flange 1d surrounding an axis 1e of the pump body. The pump body 1c is unitarily formed with a pump intake 3 having a thread 3a connectable to a source of a fluid to be displaced and a pump outlet 2 formed with a threaded flange 20a connectable to the pipe line or unit to be supplied with the fluid.

The impeller 4 is mounted on a rotor 5 which is rotatable within a motor can 6 which has a cylindrical portion 6a surrounding the rotor and extending over the length thereof coaxial with the axis 1a. The can 6 separates the stator from the rotor and the fluid medium side of the pump 1. A flange 7 of the can 6 can be pressed against the O-ring 7a seated in the cylindrical projection 1b.

A coil or winding carrier 8 (see also FIG. 2) is fitted over the cylindrical portion 6a of the motor can and carries the stator winding 17.

Figure 2:
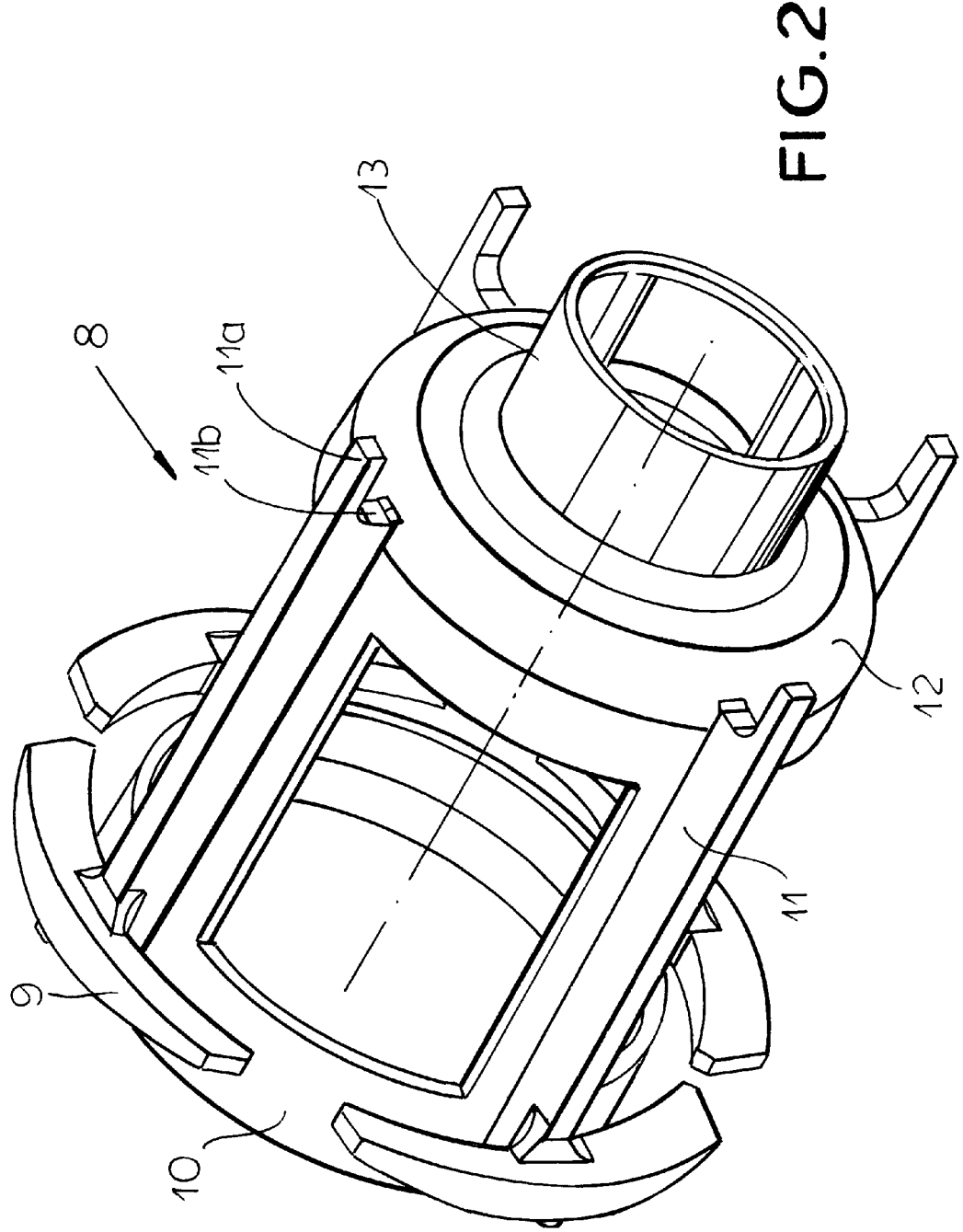
FIG. 2 is a perspective view of the winding carrier.

As can be seen from FIG. 2, the winding carrier 8 has collar-like fastening formations 9 which can be arrested in the pump housing. In particular, the collars 9 may engage the left-hand side of the stator sheet stack 19 which can be anchored in the casing 20. The latter is formed with a flange 20b which can press the flange 7 against an O-ring 7a in a groove of the projection 1b, the flanges 20b and 1d being clamped together by screws 22.

The cylindrical stator sheet stack 19 lies against the side of the carrier 8 turned away from the can 6. The stator windings 17 are connected via contacts 16 with the electronic circuitry 14 of the pump which is mounted in a casing cover 15 which is connected to the casing 20 via a seal joint 15a.

FIG. 2 also shows that the winding carrier 8 has a cylindrical portion which is formed by a pair of ring elements 10, 12 bridged by axial bars 11. The entire carrier 8 may be injection molded from a heat resistant synthetic resin, as has also been noted, in one piece. The inner diameter of this cylindrical portion corresponds to the outer diameter of the cylindrical part of the motor can 6 so that when the winding carrier is shoved over the motor can 6, it intimately contacts the latter to promote heat exchange between the can and the carrier. A cylindrical part 13 projects outwardly from the ring 12 and can closely surround and contact a cylindrical boss 6b of the can. The boss 6b can receive one of the bearings 5a of the rotor 5.

The tubular part 13 receives the contact block 16a which interengages with the contact 16 previously described of the electronic circuitry to connect the stator to the motor electronics 14 as has been described.

The canned motor pump of the invention can be assembled in various ways. Firstly, the can 6 can be fitted to the body 1c of the pump having the inlet 3 and the outlet 2, and then the winding carrier 8, previously formed with the windings or coil 17 can be shoved over the can, whereupon the casing 20 is applied and secured in place by the screws 22. The casing 20 can be pressed against the flange or collar 7 of the can and simultaneously can form a seal at 7a. Then the stator sheet stack 19 can be shoved over the carrier 8 and the coil 17. To receive the coils, the bars 11 may have fingers 11a which define notches 11b in which the coil is fitted. The cover 15 can then be applied to cause the plug contact 16 to engage the contacts for the stator carried by the carrier portion 13. The coil 17 can be baked or otherwise permanently affixed to the carrier 8.

If the stator need not be separately dismounted upon release of the screws 22, the entire unit comprised of the motor 1m can be separated from the pump body 1c simply by releasing the screws 22 and detaching the impeller 4, the rotor 5, the motor can 6, the coil carrier 8 together with the stator sheet stack 19 and the housing cover 15. It is therefore also possible to provide the can 6 with the coil carrier 8 and the stator sheet stack 19, in addition to the casing 20 and the cover 15 with all electronic circuitry 14 and then assemble this unit with the pump part 1c.

The permanent magnets of the rotor, which face outwardly and toward the motor can 6, have been represented at 18 in FIG. 1.

We claim:

1. A canned-motor pump comprising:

a pump body formed with a pump chamber, an inlet opening into said chamber and an outlet opening out of said chamber;

an impeller rotatable in said chamber about an axis generally transverse to said body;

an electric motor rotor connected to said impeller and extending along said axis;

a motor can sealed to said body and surrounding said rotor, said motor can having a cylindrical portion;

a synthetic resin cylindrical winding carrier surrounding said cylindrical portion of said motor can; and a stator winding on said carrier separated by said motor can from said rotor, said synthetic resin cylindrical winding carrier having a cylindrical inner surface which rests against a cylindrical outer surface of said motor can, said winding carrier is molded unitarily with a pair of axially-spaced rings and a plurality of angularly spaced bars connecting said rings and defining a cylindrical portion of said carrier fitted onto the cylindrical portion of said motor can, each of said bars having a projecting finger at one end thereof overhanging a respective notch, said carrier being formed with a cylindrical projection receiving one member of a plug connector making electrical connection with said winding, wherein respective parts of said winding being received in said notches between said fingers and said projection.

2. The canned-motor pump defined in claim 1 wherein the stator winding is baked onto said winding carrier and held in position thereon by baking.

3. The canned-motor pump defined in claim 1 wherein said motor can is in thermal conductive relationship with said winding carrier.

4. The canned-motor pump defined in claim 1 wherein said winding carrier is composed of a temperature-resistant synthetic resin material.

5. The canned-motor pump defined in claim 1 wherein said rotor and said stator winding form a motor which is electrically commnutated and said rotor is formed on a side thereof turned toward said motor can with permanent magnets uniformly spaced about said axis for transmitting torque from said stator to said impeller.

6. The canned-motor pump defined in claim 1 wherein said winding carrier has a side turned away from the rotor and onto which the stator winding is cast, enclosed, baked or adhesively secured.

7. The canned-motor pump defined in claim 1 wherein said housing receives electronic circuitry for controlling said pump.

* * * * *